June 12, 1962  W. M. KAUFFMANN  3,038,297
FUEL AIR CONTROLLER FOR TURBO CHARGED GAS ENGINE
Filed Jan. 21, 1960

WILLIAM M. KAUFFMANN
INVENTOR.
BY Daniel A. Bobis
ATTY

United States Patent Office 3,038,297
Patented June 12, 1962

3,038,297
FUEL AIR CONTROLLER FOR TURBO
CHARGED GAS ENGINE
William M. Kauffmann, Hamburg, N.Y., assignor to
Worthington Corporation, Hudson, N.J., a corporation
of Delaware
Filed Jan. 21, 1960, Ser. No. 3,863
8 Claims. (Cl. 60—13)

This invention relates to high compression turbo charged internal combustion engines and more particularly to an improved system for maintaining control of the proportional quantities of air and fuel delivered to the combustion space of such an engine over a wide load and speed range.

In the operation of a high compression engine, the air fuel ratio must at all times be maintained within a narrow, critical range in order to minimize erratic combustion, misfirings and regulation.

The above conditions are amplified in turbo charged engines due to the inherent blower characteristic of providing either too much or too little air for optimum operation.

Patent 2,744,511 teaches control means for use with a turbo charged engine which provide a mixture within the ignitability range of the fuel being burned by throttling the air being supplied to the combustion chamber. As is well known proper calibration of the throttling means provides correct air fuel ratios at all speed conditions.

However, in addition to being confronted with variations in speed, certain applications demand that load be variable at any partial speed to provide adjustable capacity demand from the unit being driven by the engine. Tests indicated that reducing speed at variable load caused adverse effect on the air fuel ratio. This resulted due to the substantial reduction in air flow from the turbo charger because of drastically reduced exhaust energy flow to the gas turbine end. Mixtures at reduced speed and variable torques thus became excessively rich to the extent that combustion could no longer be supported. As a consequence the unit shut itself down or detonated badly.

Accordingly, it is an object of the present invention to provide an improved control means which is adaptable for use with an engine having the above mentioned characteristics to maintain correct air fuel ratios over a wide load and speed range.

It is a further object of this invention to provide means for operating both a throttling means in the intake air conduit and a fuel valve means through a governor except at reduced engine speeds.

Operation at low engine speeds is accomplished by means which nullify governor action on the throttling means and move the throttling means to maintain the correct air fuel ratio at reduced speed and variable load at such reduced speed.

With the above objects in view and others as may appear from the accompanying specification, the invention consists of various features of construction and combination of parts, which will be first described in connection with the accompanying drawings.

Figure 1:
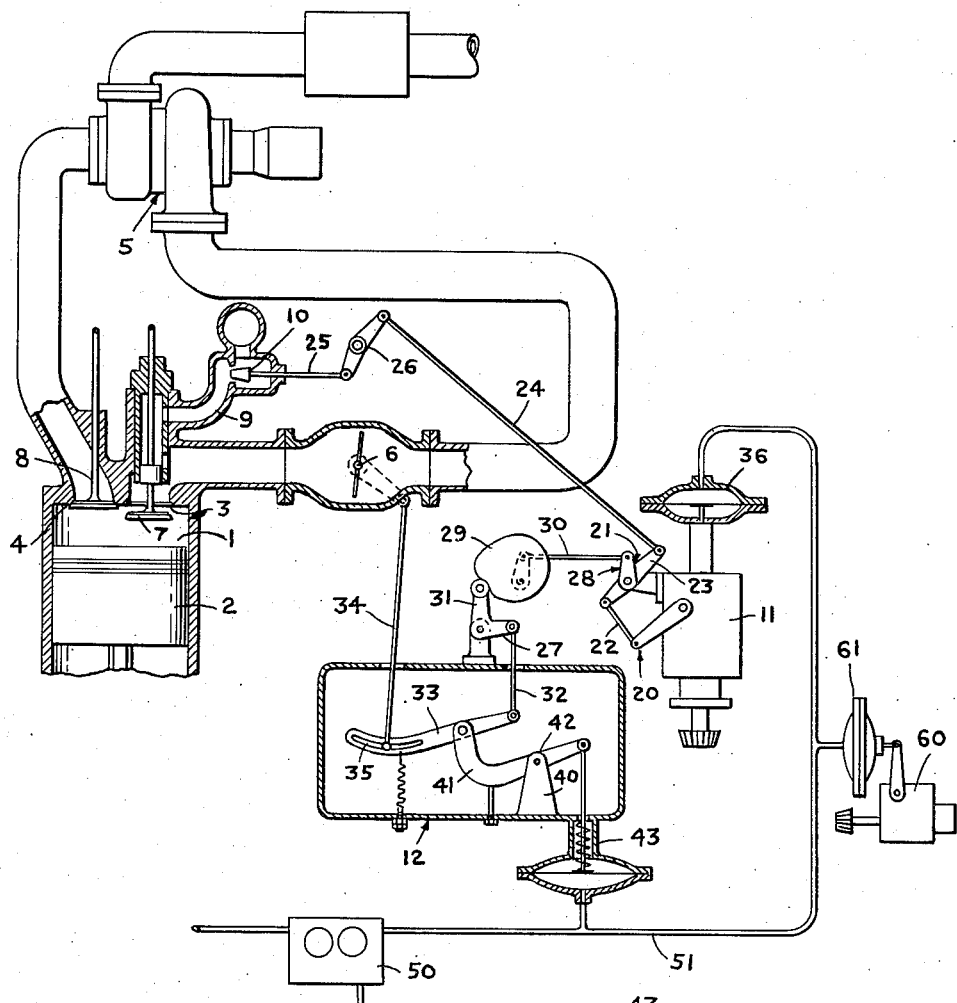
FIGURE 1 shows a fragmentary vertical section taken centrally through a typical internal combustion engine and indicated therewith more or less diagrammatically are the air, fuel and exhaust lines of said engine and the components comprising the novel control system of the present invention.

Referring to the drawings FIGURE 1 shows a high compression engine including a cylinder 1, piston 2 mounted for reciprocatory movement in the cylinder and having inlet and exhaust passages 3 and 4 respectively communicating therewith. The engine is of the turbo charged type, and the air which is mixed with the fuel to form the combustible mixture is delivered from the turbo charger 5 through the air throttling valve 6 to the inlet passage 3. Delivery of the combustible mixture into the cylinder 1 is controlled by the inlet valve 7 and exhaust of burned gases from the cylinder is controlled by exhaust valve 8. The fuel is delivered to the intake passage 3 through fuel conduit 9 and control of the rate of flow is provided for by fuel valve 10. The gas admitted into the cylinder 1 mixes with the incoming air and is delivered to the cylinder when the intake valve 7 is open by the usual means. This is the usual construction of gas engines of this type.

In order to provide an engine which is operable at optimum efficiency in an installation requiring reduced speed and variable load at such reduced speed it is necessary to provide a control system which functions to regulate the air and fuel valve means 6 and 10 to provide the required air fuel ratio.

This is accomplished in the present instant by controlling the air and fuel valves 6 and 10 at predetermined speeds through the usual governor 11 and at other predetermined speeds a component of the control means generally designated 12 operates to nullify the action of the governor 11 on air valve 6 and functions to regulate the air valve to coact with the governor actuated fuel valve to provide the required air fuel ratio.

More particularly the control means 20 contemplated herein comprises a first control member generally designated 21 which interconnects the governor 11 to both the air and fuel valves 6 and 10. Actuation of the fuel valve 10 by the governor is accomplished through a first linkage means including link 22, bell crank 23 and push rod 24 which is connected to fuel valve stem 25 through pivotable lever 26. Actuation of the air throttling valve 6 by governor 11 is accomplished by a second and third linkage arrangement generally designated 27 and 28. Governor movement is transmitted to cam 29 by bell crank 23 and push rod 30. Cam movement is transmitted to cam 29 by bell crank 23 and push rod 30. Cam movement is in turn transmitted to air valve 6 through roller lever 31, by the link member 32 and lever member 33 which are connected to said air valve by push rod 34. Slot 35 is lever 33 permits correcting air valve movement for changes in heat value or B.t.u. content of the gas being burned.

An instrument control device 50 is disposed in a line 51 that is arranged in any well known fashion to gauge capacity demand required from the unit being driven by the engine. The control device 50, which is preferably a differential pressure transmitter readily purchased on the open market, sends out a signal to the diaphragm actuating means 36 associated with the governor 11 to move same to regulate the air and gas valves to provide the most suitable air fuel ration for the demanded mode of engine operation. One such control device of the type that may be used herein is shown in United States Patent 2,808,725.

As was mentioned hereinabove regulation of an engine operative in an installation requiring constant speed variable load operation is effectively handled by a control of the above type. However, to provide a more versatile engine and one that will operate effectively in an installation requiring load changes at variable speed ranges it was necessary to reduce the amount of throttling of air valve means 6 at lower engine speeds to provide enough air to obtain the required air fuel ratio. Such a condition presented itself between a speed range of ¼ to ¾ of full engine speed.

To accomplish the foregoing regulation of the throttling means 6 at speed of less than ¾ range a second control means 40 comprising a lever 41 pivotable as at 42 and having an actuating member 43 taking the form of a diaphragm is connected to lever 33 and operates on signal from line 51 to move roller 31 out of engagement with cam 29 to thus provide means for nullifying the action of the governor on air valve 6. At the same time lever 41 through lever 33 and rod 34 moves the air valve to the wide open position and then functions to regulate same to provide the required air flow to the engine to maintain the proper air fuel ratio.

Thus with the above control it is possible to regulate the air and fuel valve to provide a mixture which is efficiently burned in engines that are required to operate as above described.

As will be evident to those skilled in the art it is necessary to provide means for retarding the magneto 60 to inhibit any detonation tendency at full or overload torque. This is most readily accomplished by actuating the magneto 60 by a diaphragm means 61 which is in turn actuated by a signal in line 51.

Figure 2:
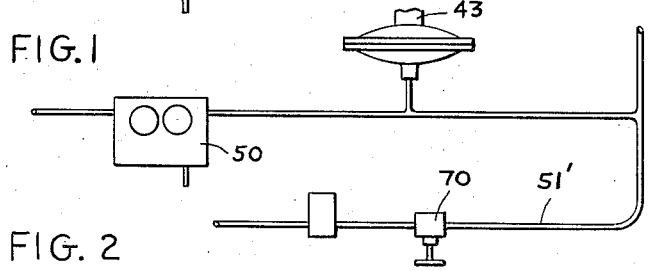
FIGURE 2 is a fragmentary vertical section showing a modified control component for use with the basic members of the control shown in FIGURE 1.

The form of the invention shown in FIGURE 2 differs only from that shown in FIGURE 1 in that operation at set pressure conditions is provided for by a manually operated device which comprises a regulating valve 70 in line 51' and the desired signal is produced by manual change of the valve 70.

It will be understood that the invention is not to be limited to the specific constrution or arrangement of parts shown but that they may be widely modified within the invention defined by the claims.

What is claimed is:

1. A controller for use in an internal combustion engine including a cylinder and piston assembly forming a cylinder combustion space, a governor, independent exhaust, air and fuel conduits connected to the cylinder combustion space, a supercharger for the engine and driven by exhaust gases of said engine and to supply pressurized air to the cylinder combustion space, valve means in both the air and fuel conduits to control the passage of air and fuel to the combustion space, said controller comprising a first control means interconnecting both of said valve means to the governor whereby both valve means are regulated to provide a predetermined air fuel ratio, second control means engaging the first control means for nullifying the action of the governor on the air valve means at a predetermined engine speed and said second control means operative to regulate the air valve means through the first control means at predetermined engine speeds, and means operatively interconnecting the governor and the second control means for sensing changes in load.

2. A controller for use in an internal combustion engine including a cylinder and piston assembly forming a cylinder combustion space, a governor, exhaust means, air and fuel means connected to the cylinder combustion space, a supercharger in the air means to supply pressurized air to the cylinder combustion space and said supercharger driven by exhaust from said engine, valve means in both the air and fuel means to control the passage of air and fuel to the combustion space, said controller comprising a first control means including linkage means interconnecting both the valve means to the governor whereby both of said valve means are regulated to provide a predetermined air fuel ratio, second control means engaging the first control means for nullifying the action of the governor on the valve means in the air means at a predetermined engine speed and said second control means connected to the air valve means to regulate same through the first control means at predetermined engine speeds, and means operatively interconnecting the governor and the second control means for sensing changes in load.

3. A controller for use in an internal combustion engine including a cylinder and piston assembly forming a cylinder combustion space, a governor, independent exhaust, air and fuel conduits connected to the cylinder combustion space, a supercharger for the engine and driven by exhaust gases of said engine and to supply pressurized air to the cylinder combustion space, valve means in both the air and fuel conduits to control the passage of air and fuel to the combustion space, said controller comprising a first control means including a first and second linkage means for respectively interconnecting the fuel and air valve to the governor whereby both valve means are regulated to provide a predetermined air fuel ratio, second control means including actuating linkage in engagement with the second linkage means and said actuating linkage for nullifying the action of the governor on the air valve means at a predetermined engine speed and the second control means operative to regulate the air valve means through the second linkage at predetermined engine speeds, and means operatively interconnecting the governor and the second control means for sensing changes in load.

4. A controller for use in an internal combustion engine including a cylinder and piston assembly forming a cylinder combustion space, a governor, independent exhaust, air and fuel conduits connected to the cylinder combustion space, a supercharger for the engine and driven by exhaust gases of said engine and to supply pressurized air to the cylinder combustion space, valve means in both the air and fuel conduits to control the passage of air and fuel to the combustion space, said controller comprising a first control means including a first linkage means for interconnecting the fuel valve means and governor, a second and third linkage means for the first control means and operatively interconnecting the air valve means to the governor at predetermined engine speeds whereby both valve means are regulated to provide a predetermined air fuel ratio to the combustion space, second control means in engagement with the first control means to disconnect the second and third linkage means from each other at a predetermined engine speed to nullify the action of said governor on the air valve means, and the second control means connected to the air valve means in order to regulate flow through the air conduit at predetermined engine speeds, and means operatively interconnecting the governor and the second control means for sensing changes in load.

5. A controller for use in an internal combustion engine including a cylinder and piston assembly forming a cylinder combustion space, a governor, independent exhaust, air and fuel conduits connected to the cylinder combustion space, a supercharger for the engine and driven by exhaust gases of said engine and to supply pressurized air to the cylinder combustion space, valve means in both the air and fuel conduits to control the passage of air and fuel to the combustion space, said controller comprising a first control means including a first linkage means for interconnecting the fuel valve means and governor, a second and third linkage means for the first control means and operatively interconnecting the air valve means to the governor at speeds greater than ¾ range whereby both valve means are regulated to provide a predetermined air fuel ratio to the combustion space, second control means in engagement with the first control means to disconnect the second and third linkage means from each other at speeds less than ¾ range to nullify the action of said governor on the air valve means, and said second control means connected to the air valve means in order to regulate flow through the air conduit at predetermined engine speeds, and means operatively interconnecting the governor and the second control means for sensing changes in load whereby said governor and said second control means respectively regulate the fuel and air valve at speeds less than ¾ range to provide a predetermined air fuel ratio.

6. A controller for use in an internal combustion engine including a cylinder and piston assembly forming a cylinder combustion space, a governor, independent exhaust, air and fuel conduits connected to the cylinder combustion space, a supercharger for the engine and driven by exhaust gases of said engine and to supply pressurized air to the cylinder combustion, valve means in both the air and fuel conduits to control the passage of the air and fuel to the combustion space, said controller comprising a first control means for interconnecting the fuel and air valve means to the governor at predetermined engine speeds whereby both valves are regulated to provide a predetermined air fuel ratio to the combustion space, second control means in engagement with the first control means to disengage said first control means from acting on said air valve means in accordance with signals from the governor, and the second control means connected to the air valve means through said first control means in order to regulate flow through the air conduit at predetermined engine speeds, and means operatively interconnecting the governor and the second control means for sensing changes in load whereby said governor and said second control means respectively regulate the fuel and air valve means at predetermined speeds.

7. A controller for use in an internal combustion engine including a cylinder and piston assembly forming a cylinder combustion space, a governor, independent exhaust, air and fuel conduits connected to the cylinder combustion space, a supercharger for the engine and driven by exhaust gases of said engine and to supply pressurized air to the cylinder combustion space, valve means in both the air and fuel conduits to control the passage of air and fuel to the combustion space, said controller comprising a first control means including a first linkage means for interconnecting the fuel valve means and governor, a second and third linkage for the first control means each respectively connected at one end to the governor and air valve means, means for operatively connecting said second and third linkage together whereby both said air and fuel valves are regulated by said governor to provide a predetermined air fuel ratio to the combustion space, second control means operatively connected to said means for connecting the second and third linkage to move same to disconnect the second and third linkage from each other to nullify the action of said governor on the air valve means at a predetermined speed, and said second control means connected to said third linkage means to regulate flow through the air conduit at predetermined engine speeds, and means operatively interconnecting the governor and the second control means for sensing changes in load whereby said governor and said second control means respectively regulate the fuel and air valve at speeds less than ¾ range to provide a predetermined air fuel ratio.

8. A controller for use in an internal combustion engine including a cylinder and piston assembly forming a cylinder combustion space, a governor, independent exhaust, air and fuel conduits connected to the cylinder combustion space, a supercharger for the engine and driven by exhaust gases of said engine and to supply pressurized air to the cylinder combustion space, valve means in both the air and fuel conduits to control the passage of air and fuel to the combustion space, said controller comprising a first control means including a first linkage means for interconnecting the fuel valve means and governor, a second and third linkage for the first control means, said second linkage including a cam and connected at one end to the governor, said third linkage including a pivotable roller and connected at one end to the air valve means, said cam and roller being disposed in engagement with each other whereby both said air and fuel valve means are regulated by said governor, second control means operatively connected to said third linkage to move said roller out of engagement with said cam to thereby nullify the action of said governor on the air valve means at predetermined speeds, and said second control means to operate said air valve through said third linkage to regulate flow through the air conduit at predetermined engine speeds, and means operatively interconnecting the governor and the second control means for sensing changes in load whereby said governor and said second control means respectively regulate the fuel and air valve at predetermined speeds to provide the required air fuel ratio.

References Cited in the file of this patent

UNITED STATES PATENTS

| | | |
|---|---|---|
| 2,865,164 | Kauffmann | Dec. 23, 1958 |
| 2,878,797 | Madden | Mar. 24, 1959 |
| 2,896,598 | Reggio | July 28, 1959 |